US012159457B2

(12) United States Patent
Yuan et al.

(10) Patent No.: US 12,159,457 B2
(45) Date of Patent: Dec. 3, 2024

(54) INFERRING MOISTURE FROM COLOR (71) Applicant: Deere & Company, Moline, IL (US)

(72) Inventors: Bodi Yuan, Sunnyvale, CA (US); Zhiqiang Yuan, San Jose, CA (US); Ming Zheng, Redwood City, CA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/341,434

(22) Filed: Jun. 26, 2023

(65) Prior Publication Data

US 2023/0351745 A1 Nov. 2, 2023

Related U.S. Application Data

(62) Division of application No. 16/943,247, filed on Jul. 30, 2020, now Pat. No. 11,715,296.

(51) Int. Cl.
*G06V 20/10* (2022.01)
*A01C 1/02* (2006.01)
(Continued)

(52) U.S. Cl.
CPC ............ *G06V 20/188* (2022.01); *A01C 1/025* (2013.01); *G06N 3/045* (2023.01); *G06N 3/08* (2013.01); *G06T 7/10* (2017.01); *G06T 7/70* (2017.01); *G06T 7/90* (2017.01); *G06T 7/97* (2017.01); *A01D 75/00* (2013.01); *A01G 25/16* (2013.01);
(Continued)

(58) Field of Classification Search
CPC ...... G06V 10/56; G06V 10/82; G06V 20/188; G06N 3/08; G06N 3/045; G06N 3/084; G06T 7/90; G06T 7/60; G06T 7/97; G06T 7/10; G06T 7/70; G06T 2207/20084; G06T 2207/30188; G06T 2207/30242; G06T 2207/20081; G06T 2207/10024;
(Continued)

(56) References Cited

U.S. PATENT DOCUMENTS

2019/0346419 A1* 11/2019 Lejeune .............. G01N 33/0098

OTHER PUBLICATIONS

Huang, Min, et al. "Prediction of color and moisture content for vegetable soybean during drying using hyperspectral imaging technology." Journal of Food Engineering 128 (2014): 24-30. (Year: 2014).*

(Continued)

*Primary Examiner* — Vu Le
*Assistant Examiner* — Tracy Mangialaschi
(74) *Attorney, Agent, or Firm* — Hanley, Flight & Zimmerman, LLC (57) ABSTRACT

Techniques are described herein for using artificial intelligence to predict crop yields based on observational crop data. A method includes: obtaining a first digital image of at least one plant; segmenting the first digital image of the at least one plant to identify at least one seedpod in the first digital image; for each of the at least one seedpod in the first digital image: determining a color of the seedpod; determining a number of seeds in the seedpod; inferring, using one or more machine learning models, a moisture content of the seedpod based on the color of the seedpod; and estimating, based on the moisture content of the seedpod and the number of seeds in the seedpod, a weight of the seedpod; and predicting a crop yield based on the moisture content and the weight of each of the at least one seedpod.

18 Claims, 5 Drawing Sheets

(51) Int. Cl.
  *G06N 3/045* (2023.01)
  *G06N 3/08* (2023.01)
  *G06T 7/00* (2017.01)
  *G06T 7/10* (2017.01)
  *G06T 7/70* (2017.01)
  *G06T 7/90* (2017.01)
  *A01D 75/00* (2006.01)
  *A01G 25/16* (2006.01)
  *A01M 21/00* (2006.01)

(52) U.S. Cl.
  CPC .... *A01M 21/00* (2013.01); *G06T 2207/10024* (2013.01); *G06T 2207/20081* (2013.01); *G06T 2207/20084* (2013.01); *G06T 2207/30188* (2013.01); *G06T 2207/30242* (2013.01)

(58) Field of Classification Search
  CPC ...... A01B 79/005; A01C 1/025; A01D 75/00; A01G 25/16; A01M 21/00
  See application file for complete search history.

(56) References Cited

OTHER PUBLICATIONS

Keskin, Muharrem, et al. "Utilization of color parameters to estimate moisture content and nutrient levels of peanut leaves." Turkish Journal of Agriculture and Forestry 37.5 (2013): 604-612. (Year: 2013).*

Yuan, Wenan, et al. "Early prediction of soybean traits through color and texture features of canopy RGB imagery." Scientific reports 9.1 (2019): 1-17. (Year: 2019).*

Sarkar, Tapash Kumar, et al. "Artificial neural network-based model for predicting moisture content in rice using UAV remote sensing data." Korean Journal of Remote Sensing 34.4 (2018): 611-624. (Year: 2018).*

Yuan, Wenan, et al. "Early Prediction of Soybean Traits Through Color and Texture Features of Canopy RGB Imagery." Scientific Reports 9.1 (2019): 1-17; https://doi.org/10.1038/s41598-019-50480-x 2019.

United States Patent & Trademark Office; Invitation to Pay Additional Fees, Application No. PCT/US21/43746; 2 pages; dated Oct. 6, 2021 Oct. 6, 2021.

United States Patent & Trademark Office; International Search Report and Written Opinion issued in PCT Application No. PCT/US21/43746; 15 pages; dated Dec. 16, 2021 Dec. 16, 2021.

Keskin, M et al.; Utilization of color parameters to estimate moisture content and nutrient levels of peanut leaves; Turkish Journal of Agriculture and Forestry 37.5; pp. 604-612; dated 2013.

Sarkar, T et al.; Artificial neural network-based model for predicting moisture content in rice using UAV remote sensing data; Korean Journal of Remote Sensing 34.4; pp. 611-624; dated 2018.

Huang, M et al.; Prediction of color and moisture content for vegetable soybean during using hyperspectral imaging technology; Journal of Food Engineering 128: 24-30; dated 2014.

* cited by examiner

INFERRING MOISTURE FROM COLOR

BACKGROUND

Crop yields may be influenced by myriad factors, both naturally-occurring and induced by humans. Naturally-occurring factors include, but are not limited to, climate-related factors such as temperature, precipitation, humidity, as well as other naturally-occurring factors such as disease, animals and insects, soil composition and/or quality, and availability of sunlight, to name a few. Human-induced factors are myriad, and include application of pesticides, application of fertilizers, crop rotation, applied irrigation, soil management, crop choice, and disease management, to name a few.

One source of observational crop data is farm machinery, which are becoming increasingly sophisticated. For example, some tractors and harvesters are configured to automatically collect and log various data, such as digital images of crops, where they were operated (e.g., using position coordinate data), and so forth. In some cases, tractor-generated and harvester-generated data may be uploaded by one or more tractors and harvesters (e.g., in real time or during downtime) to a central repository of tractor-generated and harvester-generated data. Agricultural personnel such as farmers or entities that analyze crop yields and patterns may utilize this data for various purposes.

In addition to factors that influence crop yields, detailed observational data is becoming increasingly available in the agriculture domain. Myriad data related to soil quality, aeration, etc., may be gathered from one or more sensors deployed throughout a geographic area such as a field. As another example, digital images captured from high elevations, such as satellite images, images captured by unmanned aerial vehicles, manned aircraft, or images captured by high elevation manned aircraft (e.g., space shuttles), are becoming increasingly important for agricultural applications, such as estimating a current state or health of a field. However, high-elevation digital imagery presents various challenges, such as the fact that 30-60% of such images tend to be covered by clouds, shadows, haze and/or snow. Moreover, the usefulness of these high-elevation digital images is limited by factors such as observation resolutions and/or the frequency at which they are acquired.

SUMMARY

Techniques described herein relate to using artificial intelligence to predict crop yields based on observational crop data. In various implementations, one or more machine learning models, such as a convolutional neural network model or other deep learning model, may be trained to generate output that is indicative, for instance, of predicted crop yield. For example, the output may include moisture content of seedpods and weight of seedpods, which may be used to predict a crop yield. Inputs to such a model may include various combinations of the observational data points described previously. For example, the input may include a color of the seedpods and a number of seeds in the seedpods, which may be determined based on digital images of crops that are segmented to identify seedpods.

For example, a first digital image of at least one plant can be obtained, and the first digital image of the at least one plant can be segmented to identify at least one seedpod in the first digital image. For each of the at least one seedpod in the first digital image, a color of the seedpod can be determined, and a number of seeds in the seedpod can be determined. One or more machine learning models can then be used to infer a moisture content of the seedpod based on the color of the seedpod. A weight of the seedpod can be estimated based on the moisture content of the seedpod and the number of seeds in the seedpod. A crop yield can then be predicted based on the moisture content and the weight of each of the at least one seedpod.

In some implementations, a size of each of the at least one seedpod in the first digital image can be determined. For each of the at least one seedpod in the first digital image, the estimating the weight of the seedpod can be further based on the size of the seedpod. In some implementations, a number of seedpods on each of the at least one plant in the first digital image can be determined, and the predicting the crop yield can be further based on the number of seedpods on each of the at least one plant in the first digital image.

In some implementations, the weight that is estimated based on the moisture content can be a wet weight, and the predicting the crop yield can include predicting a dry weight based on the wet weight of each of the at least one seedpod and the moisture content of each of the at least one seedpod.

In some implementations, one or more of the machine learning models can be a convolutional neural network model. In some implementations, the first digital image can be one of a plurality of digital images of the at least one plant obtained using a multi-camera array, and the segmenting, the determining the color, the determining the number of seeds, the inferring, and the estimating can be performed using the plurality of digital images. In some implementations, the plurality of digital images can include digital images obtained at a plurality of positions along a length of a row of plants.

In some additional or alternative implementations, training data including a plurality of digital images of a plurality of plants can be received. Each of the plurality of digital images can be labeled based on a ground truth moisture content of a seedpod. The training data can be used to generate preprocessed training data. In particular, for each of the plurality of digital images, the digital image can be segmented to identify at least one seedpod in the digital image, and for each of the at least one seedpod in each of the plurality of digital images, a color of the seedpod and a number of seeds in the seedpod can be determined. One or more machine learning models can be trained to predict one or both of the moisture content of the seedpod and the weight of the seedpod, using the preprocessed training data and the ground truth moisture content.

In some implementations, the generating the preprocessed training data can further include, for each of the plurality of digital images, determining a size of each of the at least one seedpod in the digital image. In some implementations, the weight of the seedpod can be a wet weight. In some implementations, one or more of the machine learning models can be a convolutional neural network model. In some implementations, the plurality of digital images can be obtained using a multi-camera array. In some implementations, the plurality of digital images can include digital images obtained at a plurality of positions along a length of a row of plants.

In some additional or alternative implementations, a first digital image of at least one plant can be obtained, and the first digital image of the at least one plant can be segmented to identify at least one seedpod in the first digital image. For each of the at least one seedpod in the first digital image, a color of the seedpod can be determined, and a number of seeds in the seedpod can be determined. One or more machine learning models can then be used to infer one or both of a moisture content of the seedpod and a weight of the seedpod, based on the color of the seedpod and the number of seeds in the seedpod. A crop yield can then be predicted based on the moisture content and the weight of each of the at least one seedpod.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
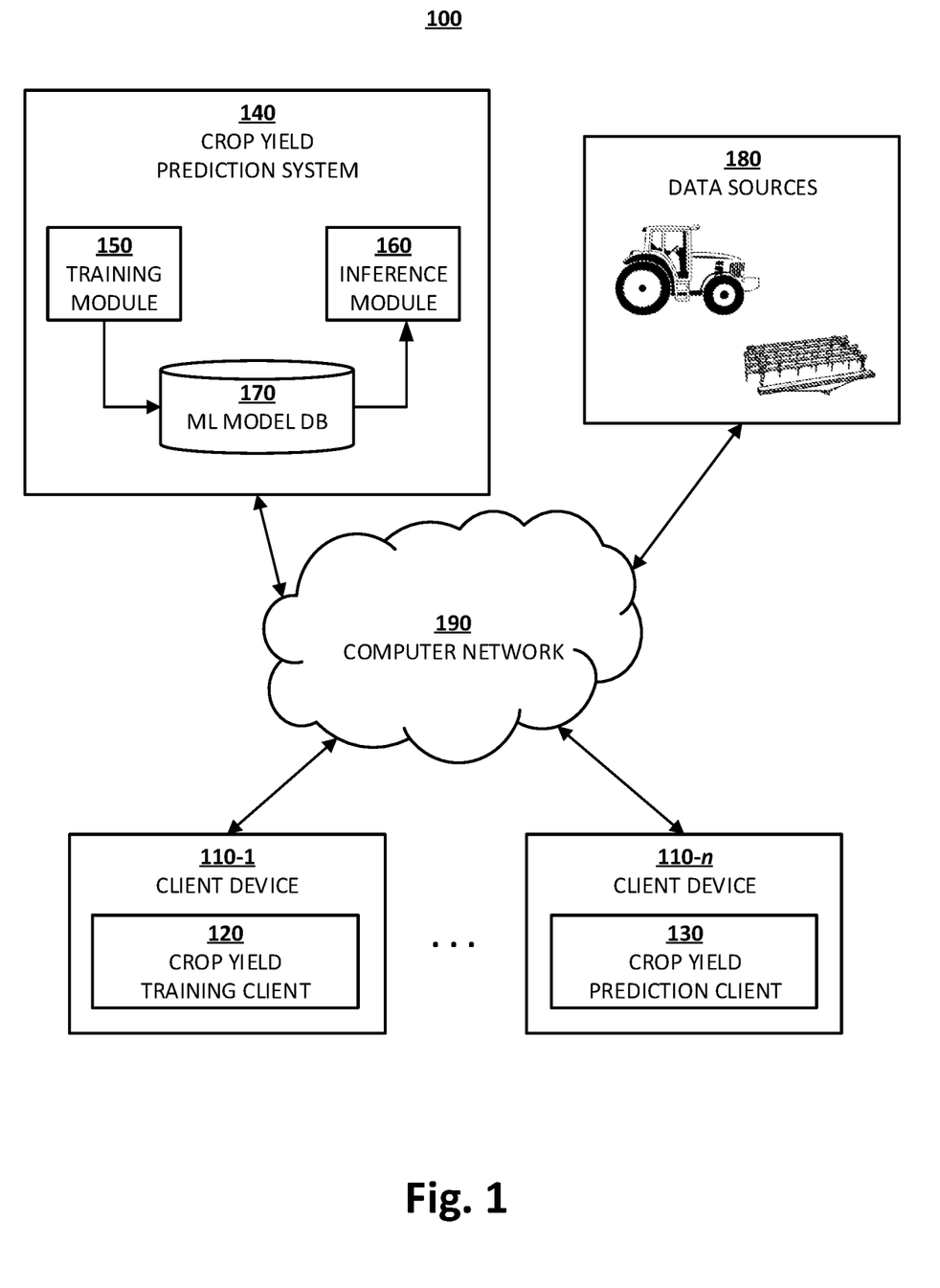
FIG. 1 depicts an example environment in which selected aspects of the present disclosure may be implemented, in accordance with various implementations.

FIG. 1 depicts an example environment 100 in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth.

In implementations, the environment 100 may include a plurality of client devices 110-1, . . . , 110-n, a crop yield prediction system 140, and data sources 180. Each of the plurality of client devices 110-1, . . . , 110-n, the crop yield prediction system 140, and the data sources 180 may be implemented in one or more computers that communicate, for example, through a computer network 190. The crop yield prediction system 140 is an example of an information retrieval system in which the systems, components, and techniques described herein may be implemented and/or with which systems, components, and techniques described herein may interface. Some of the systems depicted in FIG. 1, such as the crop yield prediction system 140 and the data sources 180, may be implemented using one or more server computing devices that form what is sometimes referred to as a "cloud infrastructure," although this is not required.

An individual (who in the current context may also be referred to as a "user") may operate one or more of the client devices 110-1, . . . , 110-n to interact with other components depicted in FIG. 1. Each component depicted in FIG. 1 may be coupled with other components through one or more networks, such as the computer network 190, which may be a local area network (LAN) or wide area network (WAN) such as the Internet. Each of the client devices 110-1, . . . , 110-n may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (with or without a display), or a wearable apparatus of the participant that includes a computing device (e.g., a watch of the participant having a computing device, glasses of the participant having a computing device). Additional and/or alternative client devices may be provided.

Each of the client devices 110-1, . . . , 110-n and the crop yield prediction system 140 may include one or more memories for storage of data and software applications, one or more processors for accessing data and executing applications, and other components that facilitate communication over a network. The operations performed by the client devices 110-1, . . . , 110-n and the crop yield prediction system 140 may be distributed across multiple computer systems. The crop yield prediction system 140 may be implemented as, for example, computer programs running on one or more computers in one or more locations that are coupled to each other through a network.

Each of the client devices 110-1, . . . , 110-n may operate a variety of different applications. For example, a first client device 110-1 may operate a crop yield training client 120 (e.g., which may be standalone or part of another application, such as part of a web browser), that may allow a user to initiate training, by training module 150 of the crop yield prediction system 140, of one or more machine learning models (e.g., deep learning models) in the machine learning model database 170 of the crop yield prediction system 140, such as a convolutional neural network model, to generate output that is indicative, for instance, of predicted crop yield. Another client device 110-n may operate a crop yield prediction client 130 that allows a user to initiate and/or study crop yield predictions provided by the inference module 160 of the crop yield prediction system 140, using one or more of machine learning models in the machine learning model database 170 of the crop yield prediction system 140.

The crop yield prediction system 140 may be configured to practice selected aspects of the present disclosure to provide users, e.g., a user interacting with the crop yield prediction client 130, with data related to crop yield predictions. In various implementations, the crop yield prediction system 140 may include a training module 150 and an inference module 160. In other implementations, one or more of the training module 150 and the inference module 160 may be combined and/or omitted.

The training module 150 may be configured to train one or more machine learning models to generate data indicative of crop yield predictions. These machine learning models may be applicable in various ways under various circumstances. For example, one machine learning model may be trained to generate crop yield predictive data for a first pod-bearing crop, such as soybeans. Another machine learning model may be trained to generate crop yield predictive data for a second pod-bearing crop, such as peas. Additionally or alternatively, in some implementations, a single machine learning model may be trained to generate crop yield predictive data for multiple crops. In some such implementations, the type of crop under consideration may be applied as input across the machine learning model, along with other data described herein.

The machine learning models trained by the training module 150 may take various forms. In some implementations, one or more machine learning models trained by the training module 150 may come in the form of neural networks. These may include, for instance, convolutional neural networks. In other implementations, the machine learning models trained by the training module 150 may include other types of neural networks and any other type of artificial intelligence model. In various implementations, the training module 150 may store the machine learning models it trains in a machine learning model database 170.

In some implementations, the training module 150 may be configured to receive, obtain, and/or retrieve training data in the form of observational data described herein and apply it across a neural network (e.g., a convolutional neural network) to generate output. The training module 150 may compare the output to a ground truth seedpod moisture content and/or seedpod weight, and train the neural network based on a difference or "error" between the output and the ground truth seedpod moisture content and/or seedpod weight. In some implementations, this may include employing techniques such as gradient descent and/or back propagation to adjust various parameters and/or weights of the neural network.

The inference module 160 may be configured to apply input data across trained machine learning models contained in the machine learning model database 170. These may include machine learning models trained by the training module 150 and/or machine learning models trained elsewhere and uploaded to the machine learning model database 170. Similar to the training module 150, in some implementations, the inference module 160 may be configured to receive, obtain, and/or retrieve observational data and apply it across a neural network to generate output. Assuming the neural network is trained, then the output may be indicative of seedpod moisture content and/or seedpod weight, which may then be used by the inference module 160 to predict a crop yield.

The training module 150 and/or the inference module 160 may receive, obtain, and/or retrieve input data from various sources, such as the data sources 180. This data received, obtained, and/or retrieved from the data sources 180 may include observational data. The observational data may include data that is obtained from various sources, including but not limited to cameras (e.g., a multi-camera array), sensors (weight, moisture, temperature, ph levels, soil composition), agricultural workers, weather databases and services, and so forth. In some implementations, data sources 180 may include vision sensor(s) mounted on human-controlled farm vehicles such as tractors or harvesters and/or vision sensor(s) mounted on autonomous or semi-autonomous agricultural equipment, such as robots. In addition to gathering observational data (which may be used for purposes such as predicting crop yield, detecting plant disease, detecting soil composition, etc.), these robots may or may not be equipped to perform various agricultural tasks, such as chemical application, irrigation, weed remediation, harvesting, etc.

In implementations, a source of observational data may be a plurality of digital images of a plurality of pod-bearing plants obtained, e.g., using a multi-camera array installed on a combine, tractor, or other farm machinery. The plurality of digital images may include high-resolution digital images obtained at a plurality of positions along a length of a row (e.g., in a field) of the pod-bearing plants (e.g., as the combine, tractor, or other farm machinery moves along the length of the row in the field). The digital images may have sufficient spatial resolution such that, when they are applied as input across one or more of the machine learning models in the machine learning model database 170, the models generate output that is likely to accurately predict seedpod moisture content and/or seedpod weight, which may then be used by the inference module 160 to accurately predict crop yield.

Figure 2:
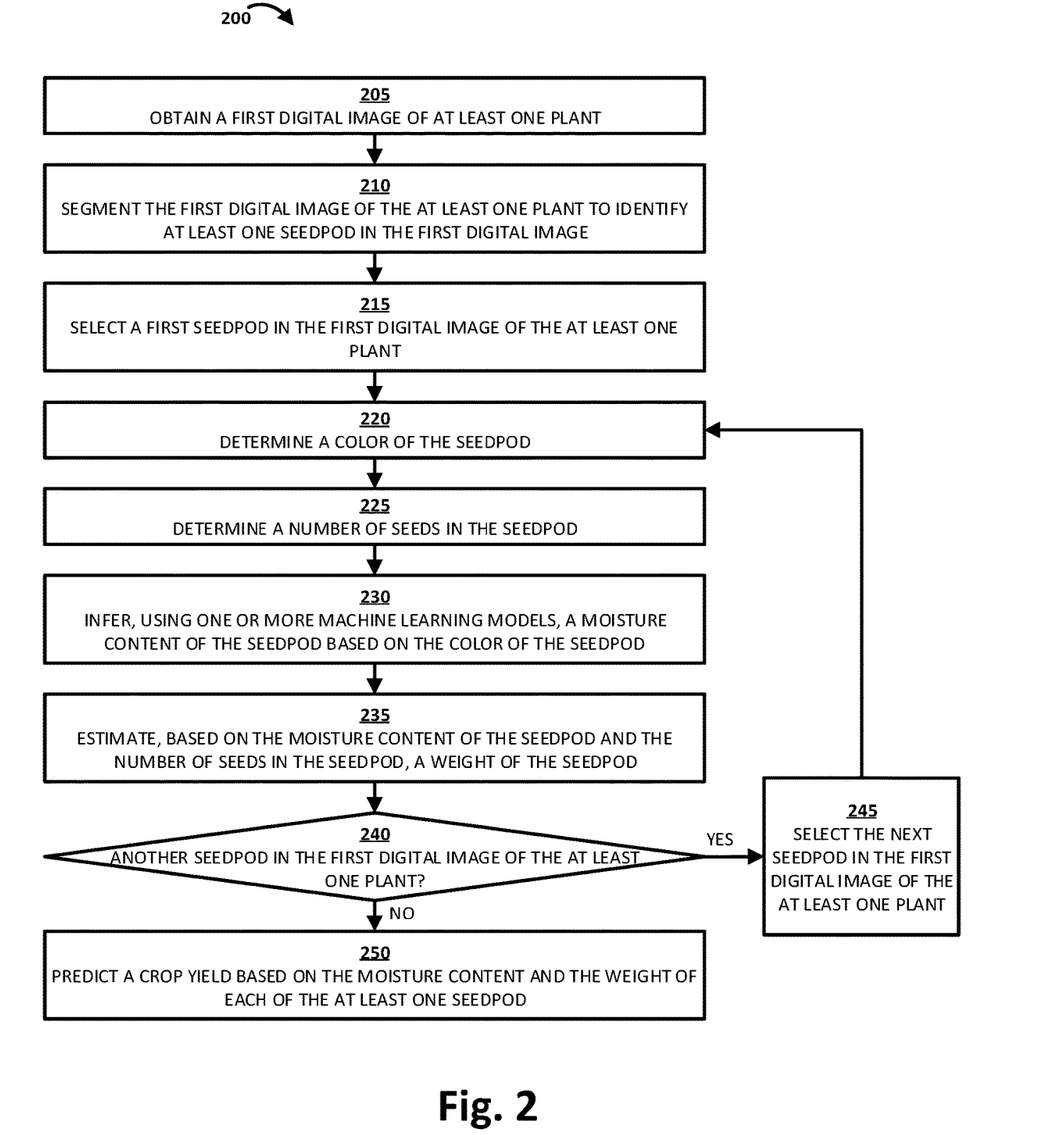
FIG. 2 depicts a flowchart illustrating an example method for practicing selected aspects of the present disclosure.

FIG. 2 is a flowchart illustrating an example method 200 of using a machine learning model to predict crop yields based on observational crop data, in accordance with implementations disclosed herein. For convenience, the operations of the flowchart are described with reference to a system that performs the operations. This system may include various components of various computer systems, such as one or more components of the client devices 110-1, . . . , 110-n, the crop yield prediction system 140, and/or the data sources 180. Moreover, while operations of method 200 are shown in a particular order, this is not meant to be limiting. One or more operations may be reordered, omitted, or added.

At block 205, the system may obtain a first digital image of at least one plant. In implementations, at block 205, the inference module 160 of the crop yield prediction system 140 may receive a request to predict crop yield from the crop yield prediction client 130 of the client device 110-n. In response to receiving the request, the inference module 160 may obtain, as observational crop data, a plurality of digital images of at least one plant, including the first digital image of at least one plant, from the data sources 180. In implementations, the plurality of digital images may be high-resolution digital images obtained, using a multi-camera array installed on a combine, tractor, or other farm machinery, at a plurality of positions along a length of a row (e.g., in a field) of the pod-bearing plants (e.g., as the combine, tractor, or other farm machinery moves along the length of the row in the field for which crop yield is to be predicted). In implementations, the plurality of digital images may be RGB (red/green/blue) images. In other implementations, the plurality of digital images may be x-ray images or hyperspectral images. The first digital image can be one of the plurality of digital images of at least one plant obtained using a multi-camera array.

Still referring to FIG. 2, at block 210, the system may segment the first digital image of the at least one plant to identify at least one seedpod in the first digital image. In implementations, at block 210, the inference module 160 of the crop yield prediction system 140 may segment each of the plurality of digital images of at least one plant, including the first digital image of at least one plant received at block 205, to identify at least one seedpod. The inference module 160 can use a convolutional neural network to segment the digital images to identify at least one seedpod. In implementations, the inference module 160 can use instance segmentation techniques to identify the pixel boundaries of each of the at least one seedpod in each of the plurality of digital images. In other implementations, the inference module 160 can use other segmentation techniques such as semantic segmentation techniques to identify the pixel boundaries of the at least one seedpod in each of the plurality of digital images.

Still referring to FIG. 2, at block 215, the system may select a first seedpod in the first digital image of the at least one plant. In implementations, at block 215, the inference module 160 of the crop yield prediction system 140 may, for each of the plurality of digital images of at least one plant, including the first digital image of at least one plant, select a first seedpod in the digital image from the seedpods identified at block 210.

Still referring to FIG. 2, at block 220, the system may determine a color of the seedpod. In implementations, at block 220, the inference module 160 of the crop yield prediction system 140 may determine a color of the seedpod selected at block 215 or block 245. The inference module 160 of the crop yield prediction system 140 can determine the color of the seedpod by retrieving a color (e.g., pixel value) for one or more pixels within the boundaries of the seedpod (determined, e.g., at block 210 using instance segmentation techniques). In implementations, the inference module 160 of the crop yield prediction system 140 may determine the color of the seedpod using an average value or a median value of all of the pixels or a sample of the pixels within the boundaries of the seedpod. The sample can be a random sample (e.g., of a predetermined number of pixels), or rules may be used to determine pixels to sample within the boundaries of the seedpod.

In other implementations, block 220 may be omitted, and at block 230, the inference module 160 of the crop yield prediction system 140 may apply the digital image(s) with their constituent pixel values which indicate color as inputs across a machine learning model. In this case, the color of the seedpod (e.g., pixel value) may be retrieved from memory as part of the machine learning inference process.

Still referring to FIG. 2, at block 225, the system may determine a number of seeds in the seedpod. In implementations, at block 225, the inference module 160 of the crop yield prediction system 140, for the seedpod selected at block 215 or block 245, may determine a number of seeds in the seedpod. The inference module 160 can use a convolutional neural network to perform object detection or image segmentation on the portion of the digital image that includes the selected seedpod. In implementations, the inference module 160 can use object detection techniques to identify instances of seeds in the selected seedpod and determine the number of seeds. In other implementations, the inference module 160 can use instance segmentation techniques or other segmentation techniques such as semantic segmentation techniques to identify the pixel boundaries of each of the seeds in the selected seedpod and determine the number of seeds. Other techniques may also be used to determine the number of seeds in the seedpod.

Still referring to FIG. 2, at block 230, the system may infer, using one or more machine learning models, a moisture content of the seedpod based on the color of the seedpod. In implementations, at block 230, the inference module 160 of the crop yield prediction system 140 applies, as inputs across one or more of the machine learning models trained as described with respect to FIG. 3 and stored in the machine learning model database 170 of the crop yield prediction system 140, the color of the seedpod determined at block 220 to generate output indicative of a moisture content of the seedpod.

Still referring to block 230, in implementations, the machine learning model used by the inference module 160 to infer the moisture content of the seedpod can be a convolutional neural network model. The moisture content that is inferred by the inference module 160 can be a percentage (e.g., 15%). The moisture content percentage can indicate the percentage of the weight of the seedpod that is attributed to moisture (water) content. In other implementations, the moisture content that is inferred by the inference module 160 may be a weight.

Still referring to FIG. 2, at block 235, the system may estimate, based on the moisture content of the seedpod and the number of seeds in the seedpod, a weight of the seedpod. In implementations, at block 235, the inference module 160 of the crop yield prediction system 140 estimates a weight of the seedpod based on the moisture content determined at block 230 and the number of seeds in the seedpod determined at block 225. The inference module 160 can use heuristics to estimate the weight of the seedpod. In implementations, the weight that is estimated based on the moisture content is a wet weight. In other implementations, the inference module 160 may use downstream layers of the machine learning model(s) used at block 230 or another machine learning model (e.g., from the machine learning model database 170) to generate output indicative of a weight of the seedpod.

Still referring to block 235, in implementations, the inference module 160 may also determine a size of each of the at least one seedpod in the first digital image. For each of the at least one seedpod in the first digital image, the inference module 160 may estimate the weight of the seedpod further based on the size of the seedpod.

Still referring to FIG. 2, at block 240, the system may determine whether or not there is another seedpod in the first digital image of the at least one plant. In implementations, at block 240, the inference module 160 of the crop yield prediction system 140 may, for each of the plurality of digital images of at least one plant, including the first digital image of at least one plant, determine whether or not there is another seedpod, identified at block 210, in the digital image. In implementations, if the inference module 160 determines that there is another seedpod in the digital image, then the flow proceeds to block 245. On the other hand, if the inference module 160 determines that there is not another seedpod in the digital image, then the flow proceeds to block 250.

Still referring to FIG. 2, at block 245, the system may select the next seedpod in the first digital image of the at least one plant. In implementations, at block 245, the inference module 160 of the crop yield prediction system 140 may, for each of the plurality of digital images of at least one plant, including the first digital image of at least one plant, select the next seedpod in the digital image from the seedpods identified at block 210. The flow may then return to block 220.

Still referring to FIG. 2, at block 250, the system may predict a crop yield based on the moisture content and the weight of each of the at least one seedpod. In implementations, at block 250, the inference module 160 of the crop yield prediction system 140 may predict a crop yield (dry weight) based on the moisture content inferred at block 230 and the weight (wet weight) estimated at block 235 of each of the seedpods in each of the plurality of digital images of at least one plant. In implementations, the inference module 160 can predict the crop yield by predicting a dry weight of each of the at least one seedpod, based on the wet weight of each of the at least one seedpod and the moisture content of each of the at least one seedpod, and totaling the predicted dry weights. In other implementations, the inference module 160 can predict the crop yield by averaging the wet weights of the pods and the moisture content of the seedpods.

In an example, the inference module 160 may infer a moisture content of 11% (e.g., averaged across all of the seedpods) at block 230 and estimate a wet weight of 58.65 lbs. (e.g., a sum of the weights of all of the seedpods) at block 235. At block 250, the inference module 160 may predict the crop yield by multiplying the wet weight of 58.65 lbs. by 0.89 (the proportion of dry matter=1−0.11, based on the moisture content of 11% or 0.11). In this example, the inference module 160 predicts that the crop yield (i.e., the dry weight of the seedpods) is 52.2 lbs.

Still referring to block 250, in implementations, the inference module 160 may also determine a number of seedpods on each of the at least one plant in the first digital image. The inference module 160 may predict the crop yield further based on the number of seedpods on each of the at least one plant in the first digital image.

In implementations, the segmenting at block 210, the determining the color at block 220, the determining the number of seeds at block 225, the inferring at block 230, and the estimating at block 235 can be performed each of using the plurality of digital images. In implementations, a single machine learning model, or an ensemble of machine learning models, may be used by the inference module 160 to perform the above aspects of example method 200.

Figure 3:
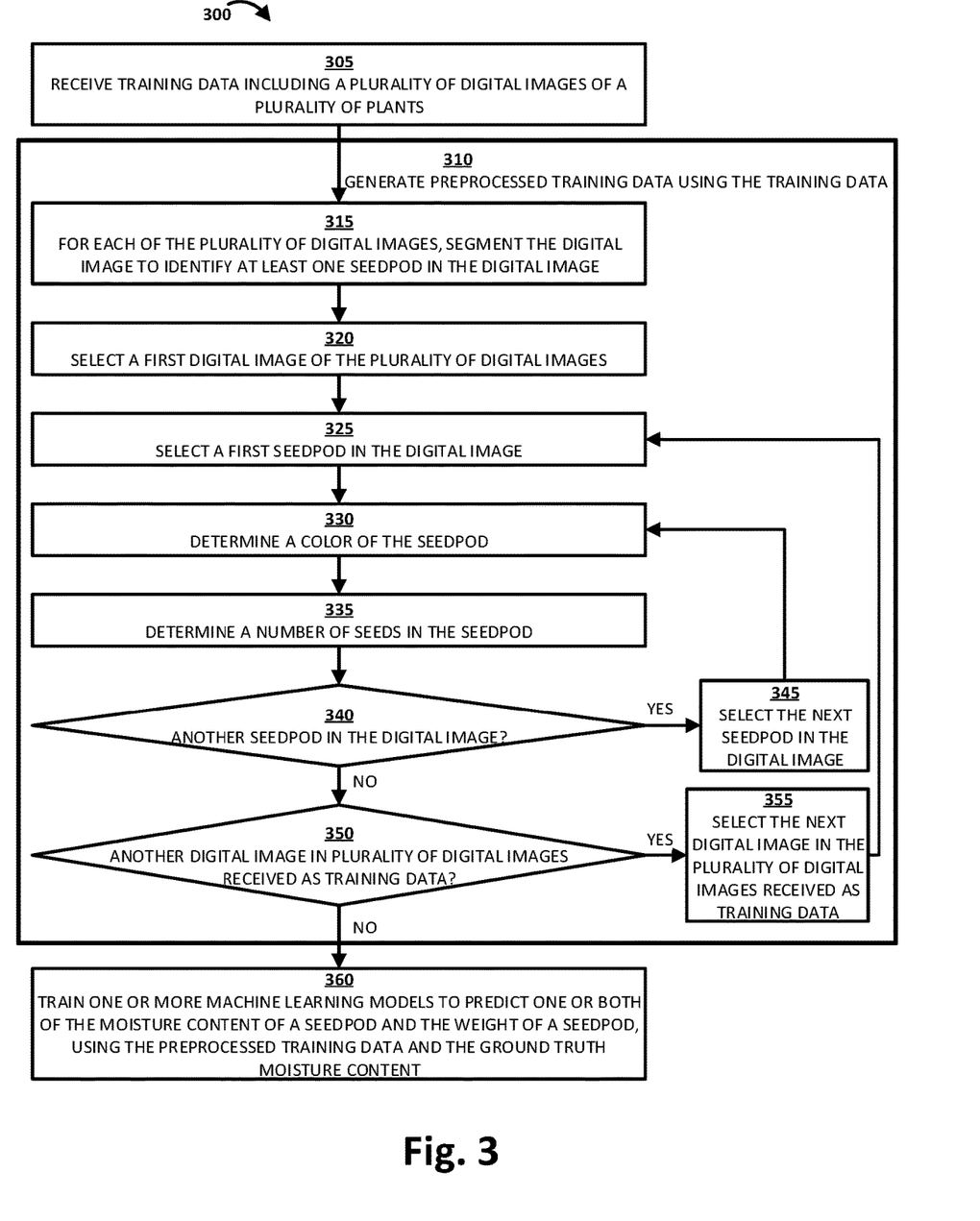
FIG. 3 depicts another flowchart illustrating an example method for practicing selected aspects of the present disclosure.

FIG. 3 is a flowchart illustrating an example method 300 of training a machine learning model to generate output that is indicative of predicted crop yield, in accordance with implementations disclosed herein. For convenience, the operations of the flowchart are described with reference to a system that performs the operations. This system may include various components of various computer systems, such as one or more components of the client devices 110-1, . . . , 110-n, the crop yield prediction system 140, and/or the data sources 180. Moreover, while operations of method 300 are shown in a particular order, this is not meant to be limiting. One or more operations may be reordered, omitted, or added.

At block 305, the system may receive training data including a plurality of digital images of a plurality of plants. Each of the plurality of digital images may be labeled based on a ground truth moisture content of a seedpod. In implementations, at block 305, the training module 150 of the crop yield prediction system 140 may receive, from the crop yield training client 120 of the client device 110-1, a request to train a machine learning model in the machine learning model database 170 to generate output that is indicative of predicted crop yield. In response to receiving the request, the training module 150 may obtain, as training data, a plurality of digital images of a plurality of plants (training images) from the data sources 180. In implementations, the training images may be high-resolution digital images obtained, using a multi-camera array installed on a combine, tractor, or other farm machinery, at a plurality of positions along a length of a row (e.g., in a field) of the pod-bearing plants (e.g., as the combine, tractor, or other farm machinery moves along the length of the row in the field for which crop yield is to be predicted). Each of the training images may be labeled with a ground truth moisture content of seedpod(s) in the training image.

Still referring to FIG. 3, at block 310, the system may generate preprocessed training data using the training data. In implementations, at block 310, the training module 150 of the crop yield prediction system 140 may generate preprocessed training data using the training data received at block 305, according to blocks 315, 320, 325, 330, 335, 340, 345, 350, and 355.

Still referring to FIG. 3, at block 315, for each of the plurality of digital images, the system may segment the digital image to identify at least one seedpod in the digital image. In implementations, at block 315, for each of the plurality of training images included in the training data received at block 305, the training module 150 of the crop yield prediction system 140 may segment the training image to identify at least one seedpod in the training image. The training module 150 can use a convolutional neural network to segment the training images to identify at least one seedpod. In implementations, the training module 150 can use instance segmentation techniques to identify the pixel boundaries of each of the at least one seedpod in each of the plurality of training images. In other implementations, the training module 150 can use other segmentation techniques such as semantic segmentation techniques to identify the pixel boundaries of the at least one seedpod in each of the plurality of training images.

Still referring to FIG. 3, at block 320, the system may select a first digital image of the plurality of digital images. In implementations, at block 320, the training module 150 of the crop yield prediction system 140 may select a first training image of the plurality of training images included in the training data received at block 305.

Still referring to FIG. 3, at block 325, the system may select a first seedpod in the digital image. In implementations, at block 325, the training module 150 of the crop yield prediction system 140 may select a first seedpod in the training image selected at block 320 or block 355.

Still referring to FIG. 3, at block 330, the system may determine a color of the seedpod. In implementations, at block 330, the training module 150 of the crop yield prediction system 140 may determine a color of the seedpod selected at block 325 or block 345. The training module 150 of the crop yield prediction system 140 can determine the color of the seedpod by retrieving a color (e.g., pixel value) for one or more pixels within the boundaries of the seedpod (determined, e.g., at block 315 using instance segmentation techniques). In implementations, the training module 150 of the crop yield prediction system 140 may determine the color of the seedpod using an average value or a median value of all of the pixels or a sample of the pixels within the boundaries of the seedpod. The sample can be a random sample (e.g., of a predetermined number of pixels), or rules may be used to determine pixels to sample within the boundaries of the seedpod.

In other implementations, block 330 may be omitted, and at block 360, the training module 150 of the crop yield prediction system 140 may apply the training image(s) with their constituent pixel values which indicate color as inputs across a machine learning model. In this case, the color of the seedpod (e.g., pixel value) may be retrieved from memory as part of the machine learning inference process.

Still referring to FIG. 3, at block 335, the system may determine a number of seeds in the seedpod. In implementations, at block 335, the training module 150 of the crop yield prediction system 140, for the seedpod selected at block 325 or block 345, may determine a number of seeds in the seedpod. The training module 150 can use a convolutional neural network to perform object detection or image segmentation on the portion of the training image that includes the selected seedpod. In implementations, the training module 150 can use object detection techniques to identify instances of seeds in the selected seedpod and determine the number of seeds. In other implementations, the training module 150 can use instance segmentation techniques or other segmentation techniques such as semantic segmentation techniques to identify the pixel boundaries each of the seeds in the selected seedpod and determine the number of seeds. Other techniques may also be used to determine the number of seeds in the seedpod.

Still referring to FIG. 3, at block 340, the system may determine whether or not there is another seedpod in the digital image. In implementations, at block 340, the training module 150 of the crop yield prediction system 140 may determine whether or not there is another seedpod, identified at block 315, in the training image selected at block 320 or 355. In implementations, if the training module 150 determines that there is another seedpod in the training image, then the flow proceeds to block 345. On the other hand, if the training module 150 determines that there is not another seedpod in the training image, then the flow proceeds to block 350.

Still referring to FIG. 3, at block 345, the system may select the next seedpod in the digital image. In implementations, at block 345, the training module 150 of the crop yield prediction system 140 may select the next seedpod in the training image selected at block 320 or 355 from the seedpods identified at block 315. The flow may then return to block 330.

Still referring to FIG. 3, at block 350, the system may determine whether or not there is another digital image in the plurality of digital images received as training data. In implementations, at block 350, the training module 150 of the crop yield prediction system 140 may determine whether or not there is another training image in the plurality of training images received as training data at block 305. In implementations, if the training module 150 determines that there is another training image in the plurality of training images, then the flow proceeds to block 355. On the other hand, if the training module 150 determines that there is not another training image in the plurality of training images, then the flow proceeds to block 360.

Still referring to FIG. 3, at block 355, the system may select the next digital image in the plurality of digital images received as training data. In implementations, at block 355, the training module 150 of the crop yield prediction system 140 may select the next training image in the plurality of training images received as training data at block 305. The flow may then return to block 325.

Still referring to FIG. 3, at block 360, the system may train one or more machine learning models to predict one or both of the moisture content of a seedpod and the weight of a seedpod, using the preprocessed training data and the ground truth moisture content. In implementations, at block 360, the training module 150 of the crop yield prediction system 140 may train one or more machine learning models in the machine learning model database 170 to predict one or both of the moisture content of a seedpod and the wet weight of a seedpod, using the preprocessed training data generated at block 310 and the ground truth moisture content labels included in the training data received at block 305.

Still referring to block 360, in implementations, the training module 150 may compare the output of one or more machine learning models (e.g., a convolutional neural network) being trained to a ground truth seedpod moisture content and/or seedpod weight (included in the training data received at block 305), and train machine learning models based on a difference or "error" between the output and the ground truth seedpod moisture content and/or seedpod weight. In some implementations, this may include employing techniques such as gradient descent and/or back propagation to adjust various parameters and/or weights of the neural network.

In other implementations, in the generating the preprocessed training data, for each of the plurality of digital images, the training module 150 further determines a size of each of the at least one seedpod in the digital image.

Figure 4:
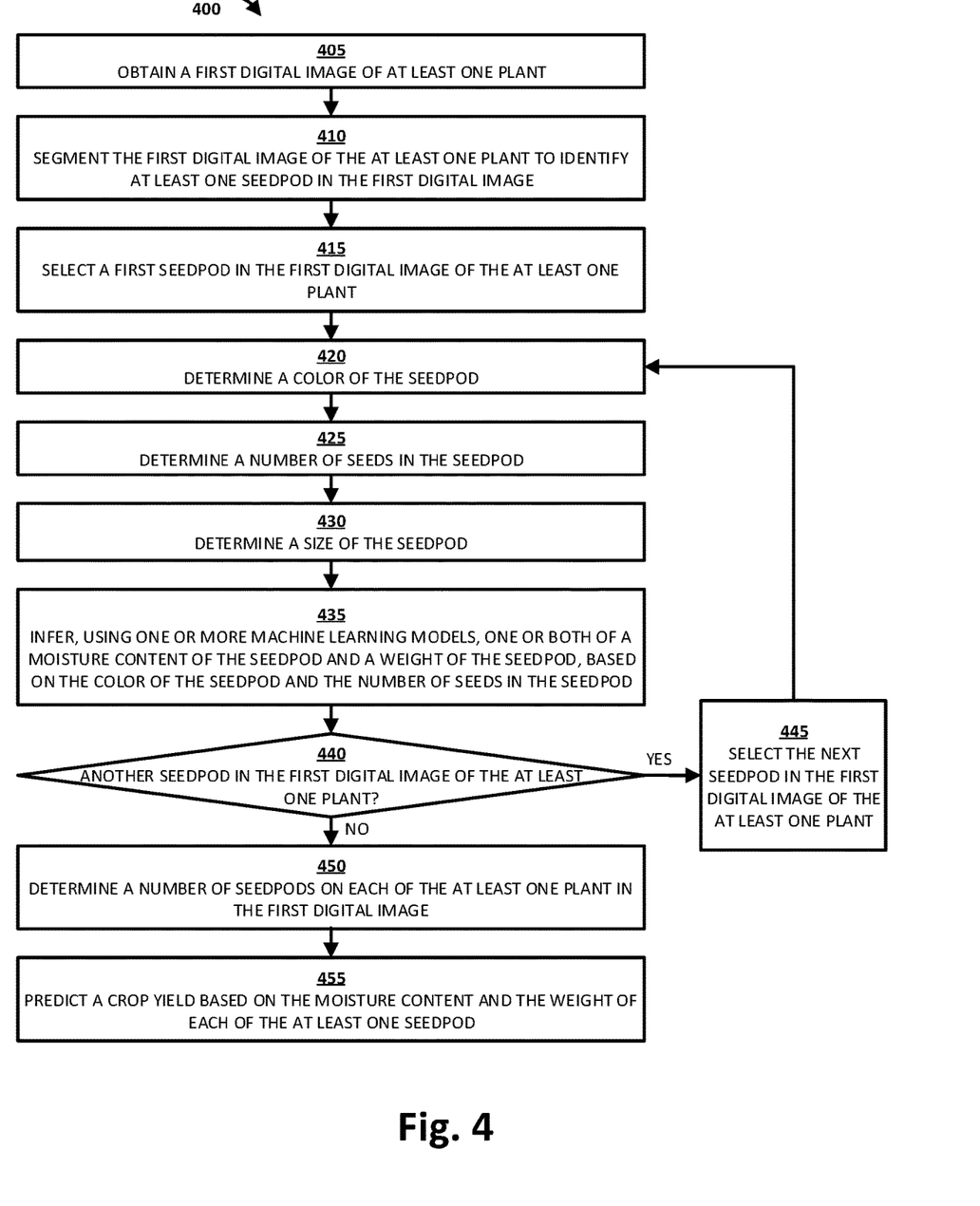
FIG. 4 depicts another flowchart illustrating an example method for practicing selected aspects of the present disclosure.

FIG. 4 is a flowchart illustrating an example method 400 of using a machine learning model to predict crop yields based on observational crop data, in accordance with implementations disclosed herein. For convenience, the operations of the flowchart are described with reference to a system that performs the operations. This system may include various components of various computer systems, such as one or more components of the client devices 110-1, . . . , 110-n, the crop yield prediction system 140, and/or the data sources 180. Moreover, while operations of method 400 are shown in a particular order, this is not meant to be limiting. One or more operations may be reordered, omitted, or added.

At block 405, the system may obtain a first digital image of at least one plant. In implementations, at block 405, the inference module 160 of the crop yield prediction system 140 may receive a request to predict crop yield from the crop yield prediction client 130 of the client device 110-n. In response to receiving the request, the inference module 160 may obtain, as observational crop data, a plurality of digital images of at least one plant, including the first digital image of at least one plant, from the data sources 180. In implementations, the plurality of digital images may be high-resolution digital images obtained, using a multi-camera array installed on a combine, tractor, or other farm machinery, at a plurality of positions along a length of a row (e.g., in a field) of the pod-bearing plants (e.g., as the combine, tractor, or other farm machinery moves along the length of the row in the field for which crop yield is to be predicted). The first digital image can be one of the plurality of digital images of at least one plant obtained using a multi-camera array.

Still referring to FIG. 4, at block 410, the system may segment the first digital image of the at least one plant to identify at least one seedpod in the first digital image. In implementations, at block 410, the inference module 160 of the crop yield prediction system 140 may segment each of the plurality of digital images of at least one plant, including the first digital image of at least one plant received at block 405, to identify at least one seedpod. The inference module 160 can use a convolutional neural network to segment the digital images to identify at least one seedpod. In implementations, the inference module 160 can use instance segmentation techniques to identify the pixel boundaries each of the at least one seedpod in each of the plurality of digital images. In other implementations, the inference module 160 can use other segmentation techniques such as semantic segmentation techniques to identify the pixel boundaries of the at least one seedpod in each of the plurality of digital images.

Still referring to FIG. 4, at block 415, the system may select a first seedpod in the first digital image of the at least one plant. In implementations, at block 415, the inference module 160 of the crop yield prediction system 140 may, for each of the plurality of digital images of at least one plant, including the first digital image of at least one plant, select a first seedpod in the digital image from the seedpods identified at block 410.

Still referring to FIG. 4, at block 420, the system may determine a color of the seedpod. In implementations, at block 420, the inference module 160 of the crop yield prediction system 140 may determine a color of the seedpod selected at block 415 or block 445. The inference module 160 of the crop yield prediction system 140 can determine the color of the seedpod by retrieving a color (e.g., pixel value) for one or more pixels within the boundaries of the seedpod (determined, e.g., at block 410 using instance segmentation techniques). In implementations, the inference module 160 of the crop yield prediction system 140 may determine the color of the seedpod using an average value or a median value of all of the pixels or a sample of the pixels within the boundaries of the seedpod. The sample can be a random sample (e.g., of a predetermined number of pixels), or rules may be used to determine pixels to sample within the boundaries of the seedpod.

In other implementations, block 420 may be omitted, and at block 435, the inference module 160 of the crop yield prediction system 140 may apply the digital image(s) with their constituent pixel values which indicate color as inputs across a machine learning model. In this case, the color of the seedpod (e.g., pixel value) may be retrieved from memory as part of the machine learning inference process.

Still referring to FIG. 4, at block 425, the system may determine a number of seeds in the seedpod. In implementations, at block 425, the inference module 160 of the crop yield prediction system 140, for the seedpod selected at block 415 or block 445, may determine a number of seeds in the seedpod. The inference module 160 can use a convolutional neural network to perform object detection or image segmentation on the portion of the digital image that includes the selected seedpod. In implementations, the inference module 160 can use object detection techniques to identify instances of seeds in the selected seedpod and determine the number of seeds. In other implementations, the inference module 160 can use instance segmentation techniques or other segmentation techniques such as semantic segmentation techniques to identify the pixel boundaries of each of the seeds in the selected seedpod and determine the number of seeds. Other techniques may also be used to determine the number of seeds in the seedpod.

Still referring to FIG. 4, at block 430, the system may determine a size of the seedpod. In implementations, at block 430, the inference module 160 of the crop yield prediction system 140, for the seedpod selected at block 415 or block 445, may determine a size of the seedpod (e.g., a volume of the seedpod, or one or more dimensions such as length, width, and depth).

Still referring to FIG. 4, at block 435, the system may infer, using one or more machine learning models, one or both of a moisture content of the seedpod and a weight of the seedpod, based on the color of the seedpod and the number of seeds in the seedpod. In implementations, at block 435, the inference module 160 of the crop yield prediction system 140 applies, as inputs across one or more of the machine learning models trained as described with respect to FIG. 3 and stored in the machine learning model database 170 of the crop yield prediction system 140, the color of the seedpod determined at block 420 and the number of seeds in the seedpod determined at block 425 to generate output indicative of one or both of a moisture content of the seedpod and a weight (e.g., a wet weight) of the seedpod. In implementations, the inference module 160 also uses the size of the seedpod determined at block 430 to the determine weight of the seedpod.

Still referring to block 435, in implementations, the machine learning model used by the inference module 160 to infer one or both of the moisture content of the seedpod and the weight of the seedpod can be a convolutional neural network model. The moisture content that is inferred by the inference module 160 can be a percentage (e.g., 15%). The moisture content percentage can indicate the percentage of the weight of the seedpod that is attributed to moisture (water) content. In other implementations, the moisture content that is inferred by the inference module 160 may be a weight of the moisture in the seedpod.

Still referring to FIG. 4, at block 440, the system may determine whether or not there is another seedpod in the first digital image of the at least one plant. In implementations, at block 440, the inference module 160 of the crop yield prediction system 140 may, for each of the plurality of digital images of at least one plant, including the first digital image of at least one plant, determine whether or not there is another seedpod, identified at block 410, in the digital image. In implementations, if the inference module 160 determines that there is another seedpod in the digital image, then the flow proceeds to block 445. On the other hand, if the inference module 160 determines that there is not another seedpod in the digital image, then the flow proceeds to block 450.

Still referring to FIG. 4, at block 445, the system may select the next seedpod in the first digital image of the at least one plant. In implementations, at block 445, the inference module 160 of the crop yield prediction system 140 may, for each of the plurality of digital images of at least one plant, including the first digital image of at least one plant, select the next seedpod in the digital image from the seedpods identified at block 410. The flow may then return to block 420.

Still referring to FIG. 4, at block 450, the system may determine a number of seedpods on each of the at least one plant in the first digital image. In implementations, at block 450, the inference module 160 of the crop yield prediction system 140 may, for each of the plurality of digital images of at least one plant, determine a number of seedpods on each of the at least one plant in the digital image.

Still referring to FIG. 4, at block 455, the system may predict a crop yield based on the moisture content and the weight of each of the at least one seedpod. In implementations, at block 455, the inference module 160 of the crop yield prediction system 140 may predict a crop yield (dry weight) based on the moisture content and/or the weight (wet weight) inferred at block 435 of each of the seedpods in each of the plurality of digital images of at least one plant. In implementations, the inference module 160 can predict the crop yield by predicting a dry weight of each of the at least one seedpod, based on the wet weight of each of the at least one seedpod and the moisture content of each of the at least one seedpod, and totaling the predicted dry weights. In other implementations, the inference module 160 can predict the crop yield by averaging the wet weights of the pods and the moisture content of the seedpods. In other implementations, the inference module 160 further uses the number of seedpods on each of the at least one plant in the first digital image, determined at block 450, to predict the crop yield.

In an example, the inference module 160 may infer a moisture content of 11% (e.g., averaged across all of the seedpods) and a wet weight of 58.65 lbs. (e.g., a sum of the weights of all of the seedpods) at block 435. At block 455, the inference module 160 may predict the crop yield by multiplying the wet weight of 58.65 lbs. by 0.89 (the proportion of dry matter=1−0.11, based on the moisture content of 11% or 0.11). In this example, the inference module 160 predicts that the crop yield (i.e., the dry weight of the seedpods) is 52.2 lbs.

Still referring to block 455, in other implementations, the inference module 160 of the crop yield prediction system 140 may predict an optimal time to harvest a crop to achieve a desired crop yield (e.g., a maximum crop yield). The inference module 160 may use time series data, including seedpod color (e.g., determined at block 420 based on images of the same plants collected over multiple days or weeks), number of seeds (e.g., determined at block 425 based on the images of the same plants collected over multiple days or weeks), and/or seedpod size (e.g., determined at block 430 based on the images of the same plants collected over multiple days or weeks) to model how the moisture content and/or weight of the seedpods are changing over time and the associated crop yields, and to predict the time at which the desired crop yield will be attained. The crop yield prediction client 130 of the client device 110-*n* may then display the optimal time (e.g., a particular date, a number of days in the future, etc.) to harvest the crop to achieve the desired crop yield.

Figure 5:
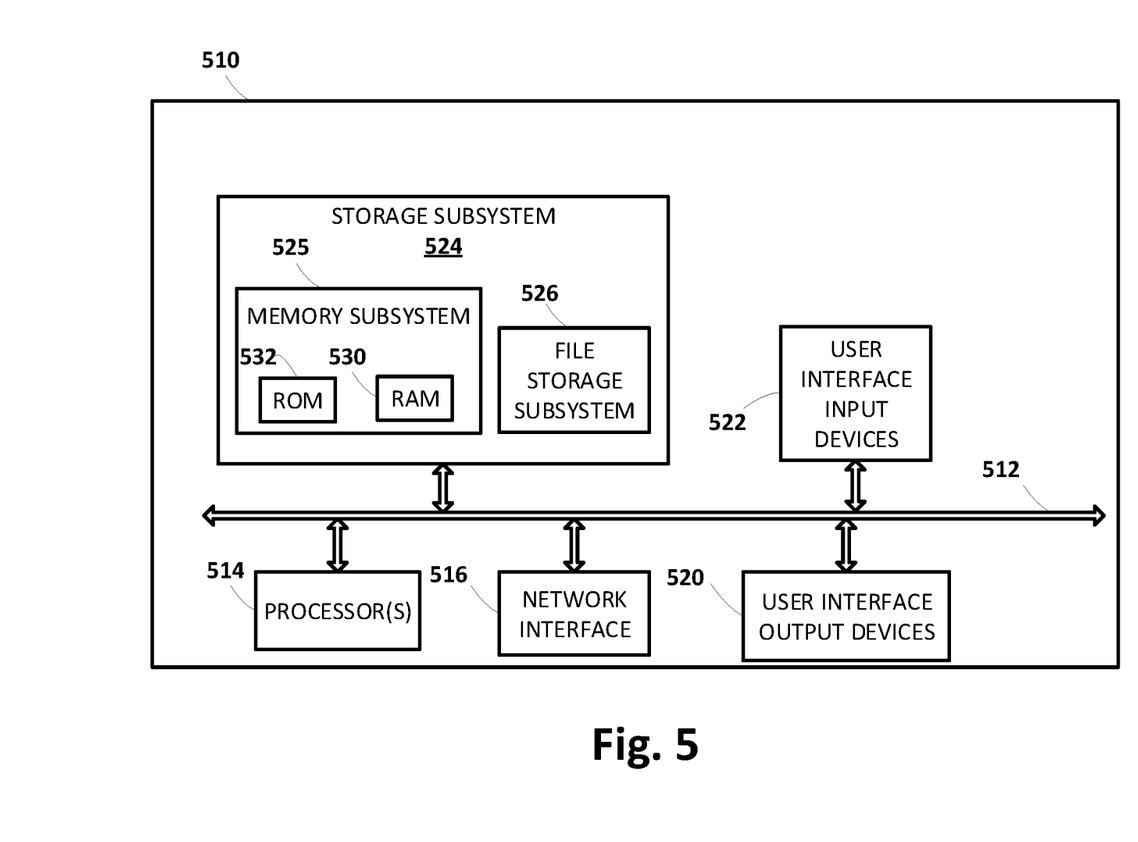
FIG. 5 illustrates an example architecture of a computing device.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods of FIGS. 2, 3, and 4, as well as to implement various components depicted in FIG. 1.

These software modules are generally executed by processor 514 alone or in combination with other processors. The memory subsystem 525 included in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

Implementations may address problems with using high-elevation digital imagery to predict crop yield by providing methods and systems for using a machine learning model to predict crop yields based on observational crop data. In particular, some implementations may improve the functioning of a computer by providing methods and systems for training a convolutional neural network and using the trained convolutional neural network to generate output that is indicative of predicted crop yield. Accordingly, through the use of rules that improve computer-related technology, implementations allow computer performance of functions not previously performable by a computer. Additionally, implementations use techniques that are, by definition, rooted in computer technology (e.g., artificial intelligence, machine learning, convolutional neural networks, image segmentation, etc.).

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
receiving training data including a digital image of a live plant in a field, wherein the digital image is labeled based on a ground truth moisture content of a first seedpod of a first live plant;
generating preprocessed training data using the training data by:
segmenting the digital image to identify the first seedpod of the first live plant in the digital image;
determining a color of the first seedpod; and
determining a number of seeds in the first seedpod;
training one or more machine learning models to predict one or both of a moisture content of the first seedpod and a weight of the first seedpod based on the preprocessed training data and the ground truth moisture content; and predicting a crop yield of a second seedpod of a second live plant based on a predicted moisture content of the first seedpod and a predicted weight of the first seedpod.

2. The method of claim 1, wherein the generating the preprocessed training data further includes determining a size of each of the first seedpod in the digital image.

3. The method of claim 1, wherein the weight of the first seedpod is a wet weight.

4. The method of claim 1, wherein one or more of the machine learning models is a convolutional neural network model.

5. The method of claim 1, wherein the digital image is obtained using a multi-camera array.

6. The method of claim 5, wherein the digital image includes a plurality of digital images obtained at a plurality of positions along a length of a row of plants.

7. At least one non-transitory computer-readable storage medium comprising program instructions to cause at least one processor to:

receive training data including a digital image of a live plant, wherein the digital image is labeled based on a ground truth moisture content of a first seedpod of a first live plant;

generate preprocessed training data using the training data, wherein to generate the preprocessed training data includes to:

segment the digital image to identify the first seedpod of the first live plant in the digital image;

determine a color of the first seedpod; and determine a number of seeds in the first seedpod;

train one or more machine learning models to predict one or both of a moisture content of the first seedpod and a weight of the first seedpod based on the preprocessed training data and the ground truth moisture content; and predict a crop yield of a second seedpod of a second live plant based on a predicted moisture content of the first seedpod and a predicted weight of the first seedpod.

8. The at least one non-transitory computer-readable storage medium of claim 7, wherein to generate the preprocessed training data further includes instructions to determine a size of each of the first seedpod in the digital image.

9. The at least one non-transitory computer-readable storage medium of claim 7, wherein the weight of the first seedpod is a wet weight.

10. The at least one non-transitory computer-readable storage medium of claim 7, wherein one or more of the machine learning models is a convolutional neural network model.

11. The at least one non-transitory computer-readable storage medium of claim 7, wherein the digital image is obtained using a multi-camera array.

12. The at least one non-transitory computer-readable storage medium of claim 11, wherein the digital image includes a plurality of digital images obtained at a plurality of positions along a length of a row of plants.

13. A system comprising:

a processor;

one or more computer-readable storage media; and program instructions stored on the one or more computer-readable storage media, the program instructions to cause the processor to:

receive training data including a digital image of a live plant in a field, wherein the digital image is labeled based on a ground truth moisture content of a first seedpod of a first live plant;

generate preprocessed training data using the training data, wherein to generate the preprocessed training data using the training data includes to:

segment the digital image to identify the first seedpod of the first live plant in the digital image;

determine a color of the first seedpod; and determine a number of seeds in the first seedpod;

train one or more machine learning models to predict one or both of a moisture content of the first seedpod and a weight of the first seedpod based on the preprocessed training data and the ground truth moisture content; and predict a crop yield of a second seedpod of a second live plant based on a predicted moisture content of the first seedpod and a predicted weight of the first seedpod.

14. The system of claim 13, wherein, to generate the preprocessed training data, the program instructions are to cause the processor to determine a size of each of the first seedpod in the digital image.

15. The system of claim 13, wherein the weight of the first seedpod is a wet weight.

16. The system of claim 13, wherein one or more of the machine learning models is a convolutional neural network model.

17. The system of claim 13, wherein the digital image is obtained using a multi-camera array.

18. The system of claim 17, wherein the digital image includes a plurality of digital images obtained at a plurality of positions along a length of a row of plants.

* * * * *